(12) United States Patent
Hsu et al.

(10) Patent No.: US 6,667,763 B1
(45) Date of Patent: Dec. 23, 2003

(54) IMAGE-SENSOR EMULATING DEVICE

(75) Inventors: Adolf T. R. Hsu, Yunlin Hsien (TW); Ching-Chih Fan, Hsinchu (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/311,584

(22) Filed: May 14, 1999

(30) Foreign Application Priority Data

Nov. 12, 1998 (TW) ...................................... 87220718 U

(51) Int. Cl.[7] .............................................. H04N 5/225
(52) U.S. Cl. .................... 348/207.99; 348/312; 348/187
(58) Field of Search ........................ 348/207.99, 207.1, 348/207.11, 222.1, 333.01, 333.02, 231.99, 231.6, 231.9, 180, 187, 188, 189, 311, 312, 294; 703/20

(56) References Cited

U.S. PATENT DOCUMENTS 5,440,339 A * 8/1995 Harrison et al. ............ 348/189
5,999,213 A * 12/1999 Tsushima et al. ........... 348/180
6,437,823 B1 * 8/2002 Zhang ......................... 348/187
6,493,023 B1 * 12/2002 Watson ....................... 348/180

* cited by examiner

Primary Examiner—Tuan Ho
(74) Attorney, Agent, or Firm—Nath & Associates PLLC; Harold L. Novick; Marvin C. Borkowitz

(57) ABSTRACT

An image-sensor emulating device establishing a link with a host system via the internal bus of the host system. The image-sensor emulating device emulates the functions of image-sensors by programmably generating the relevant image-sensor and timing signals. Alternatively, the timing signals can also be generated from the timing signals outputted by an outside image-sensor. Therefore, the emulating device can generate predetermined image-sensor signals and timing signals such that the debugging process is simplified and the developing efficiency is improved. Moreover, the emulating device according to the present invention can also generate a timing signal serving as a reference timing signal for emulating an image-sensor. The reference timing signal can be used to compare with the actual timing signals of an image-sensor.

4 Claims, 5 Drawing Sheets

IMAGE-SENSOR EMULATING DEVICE

BACKGROUND OF THE INVENTION

1. Field of the Invention

The present invention generally relates to an image-sensor emulating device. More particularly, it relates to an image-sensor emulating device capable of emulating image sensor output signals and generating image-sensor timing signals for use in debugging an image processing system or image-sensor under development.

2. Description of the Related Art

FIG. 1 schematically illustrates a circuit block diagram of a scanner 10. In FIG. 1, a light-source driver 101 of the scanner 10 controls a light source (not shown in FIG. 1) to scan an object and obtain an image pattern 102. The image pattern 102 is processed through the mechanism of projection and focus and then received by an image-sensor 103, for example a CCD or CIS device. The image-sensor 103 is controlled by the timing signal (Timing) transmitted from a scanner-engine controller 106. The image pattern 102 processed by the image-sensor 103 is amplified by an amplifier 104 and then inputted to an analog-to-digital (A/D) converter 105, thereby converting the analog image data amplified by the amplifier 104 to digital image data. At the time of A/D conversion, the scanner-engine controller 106 outputs a reference voltage to the A/D converter 105 via a digital-to-analog (D/A) converter 110. The converted digital image data is stored in a memory buffer 109 for further processing via the scanner-engine controller 106. The memory buffer 109, for example, has FIFO structure and consists of SRAM. When the image data are displayed in a host system 108, the scanner-engine controller 106 reads and processes the digital image data from the memory buffer 109. Then the digital image data is sent to the host system 108 for display via an interface controller 107.

In addition to the devices mentioned above, a scanner further comprises an oscillator 111 for providing elementary timing signals, a power-on-reset device 112 for power management, a step-motor driver 113 monitored by the scanner-engine controller 106, and other sensors 114 such as PIP, POP, etc. The scanner can also connect to other peripheral devices, if necessary, via the interface controller 107.

During the process of developing a scanner, if the scanner output images have defects or do not meet the desired level of quality, the problem-may originate in the image-sensor 103. For example, the characteristic of the image-sensor 103 could be poor or the image patterns 102 could be distorted by noise before being inputted to the image-sensor 103. If the image-sensor 103 functions without problems, then the problems must occurring in the subsequent processing circuits, such as the A/D converter, etc.

At present, function generators can not emulate the output signals of image-sensors or the timing signals controlling the image-sensors. Engineers can not use function generators to emulate "proper" output signals of image-sensors and "proper" timing signals for triggering the image-sensors to supply to the subsequent processing circuits, thereby testing whether or not the subsequent processing circuits are functioning correctly. Therefore, the debugging process is more complicated and time consuming.

SUMMARY OF THE PRESENT INVENTION

In view of these problems, one object of the present invention is to provide an emulating device for emulating the functions of image-sensors by programmably generating the relevant image-sensor and timing signals. The timing signals also can be generated from timing signals outputted by an outside image-sensor. Therefore, the emulating device can generate predetermined image-sensor signals and timing signals such that the debugging process is simplified and the developing efficiency is also improved. Moreover, the emulating device according to the present invention can also generate a timing signal serving as a reference timing signal for emulating image-sensors. The reference timing signal can be used to compare with the actual timing signals of image-sensors.

In order to achieve the above objects, an image-sensor emulating device is provided for emulating the functions of the image-sensors of an image processing system in a debugging process. The image-sensor emulating device comprises: a controller establishing a link with a host system in which the image processing system displays images via the internal bus of the host system, the controller generating a reference timing signal for sensing images; at least one buffering memory device for storing reference image patterns downloaded from the host system to the controller; and at least one output converter receiving the reference image patterns read from the buffering memory device by the controller and converting the reference image patterns as output signals of the image-sensor emulating device; wherein, the controller reads the reference image patterns in response to the reference timing signal for image sensing generated by the controller itself or a timing signal generated by the image processing system.

BRIEF DESCRIPTIONS OF THE DRAWINGS

The following detailed description, given by way of example and not intended to limit the invention solely to the embodiments described herein, will best be understood in conjunction with the accompanying drawings, in which:

FIG. 1 schematically illustrates a circuit block diagram of a scanner;

DETAILED DESCRIPTIONS OF THE PRESENT INVENTION

Figure 1:
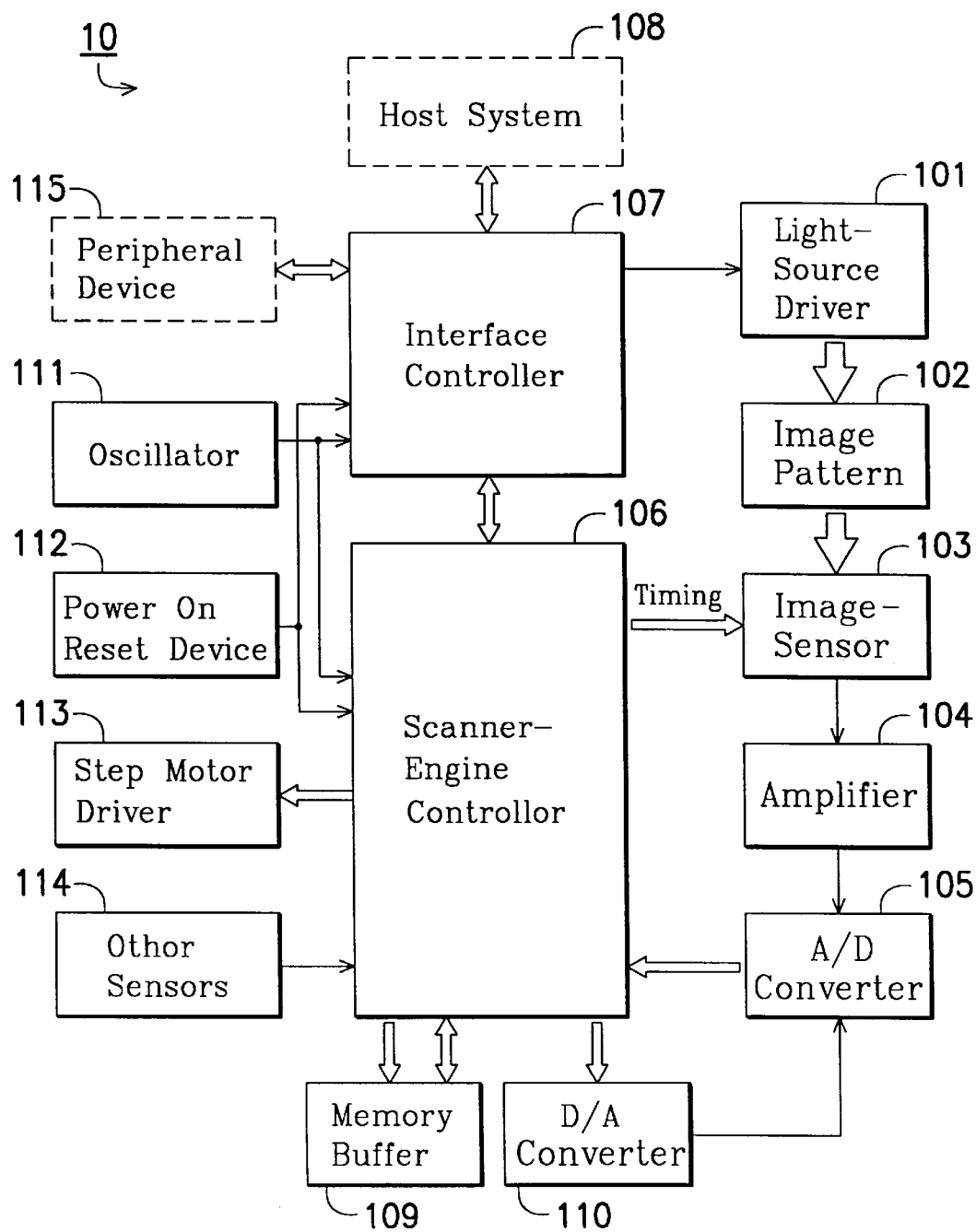
Figure 2:
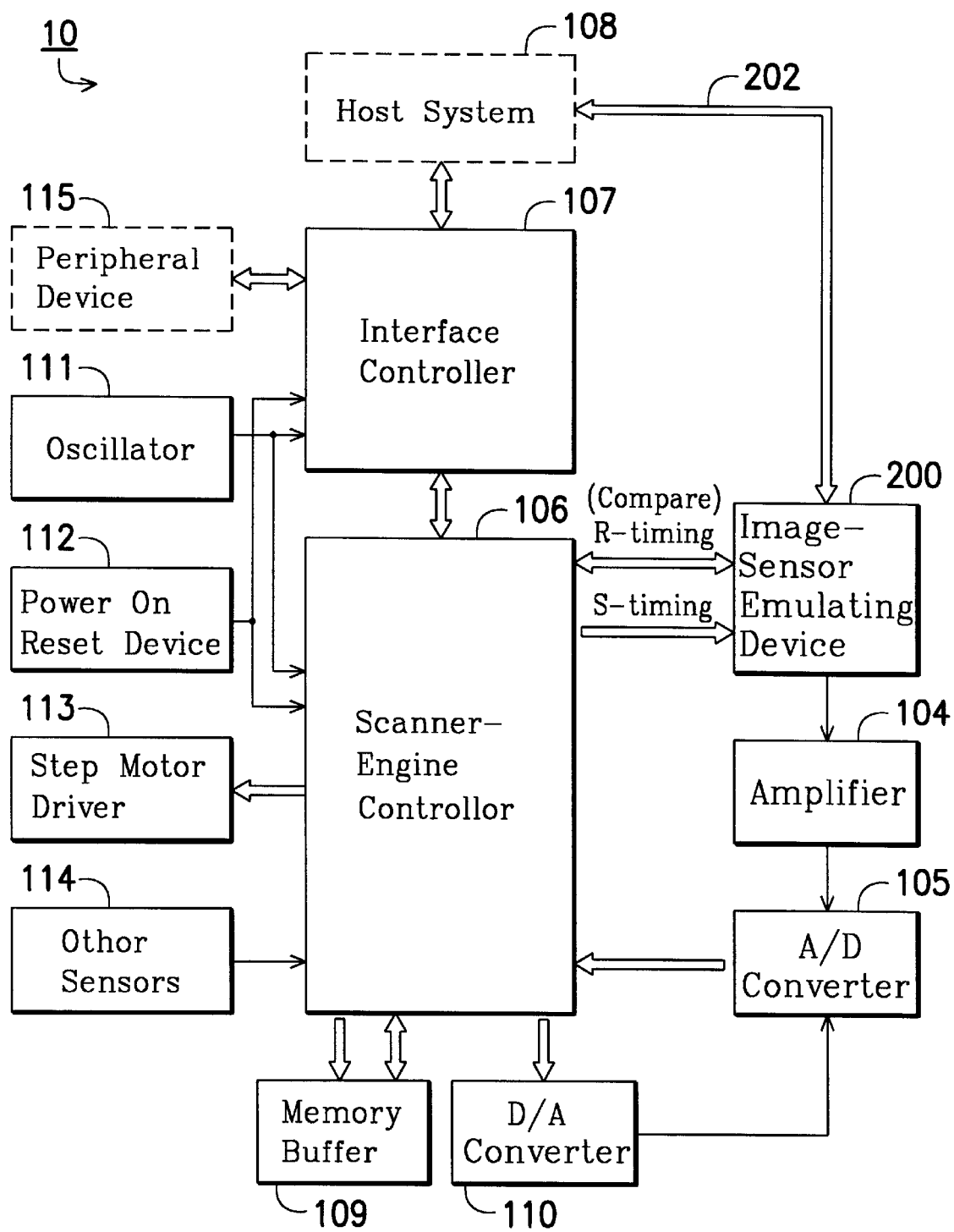
FIG. 2 illustrates an arrangement of the image-sensor emulating device applied in a debugging process of a scanner.

FIG. 2 illustrates an arrangement of the image-sensor emulating device applied in the debugging process of a scanner, wherein the same devices as described in FIG. 1 are depicted with the same notations and numerals. In FIG. 2, the numeral 200 represents an image-sensor emulating device according to the present invention.

The image-sensor emulating device 200 establishes a link with a host system (108) via an internal bus (202) of the host system such as one of the buses ISA, EISA, PCI. The image-sensor emulating device 200 is triggered to output emulating signals in response to a timing signal (S_timing) generated by the scanner-engine controller 106, or to a reference timing signal (R_timing) for image sensing generated by the image-sensor emulating device itself. The R_timing signal generated by the image-sensor emulating device can be compared with the $S_{13}$ timing signal generated by the scanner-engine controller 106 for carrying out the debugging process.

First Embodiment

Figure 3:
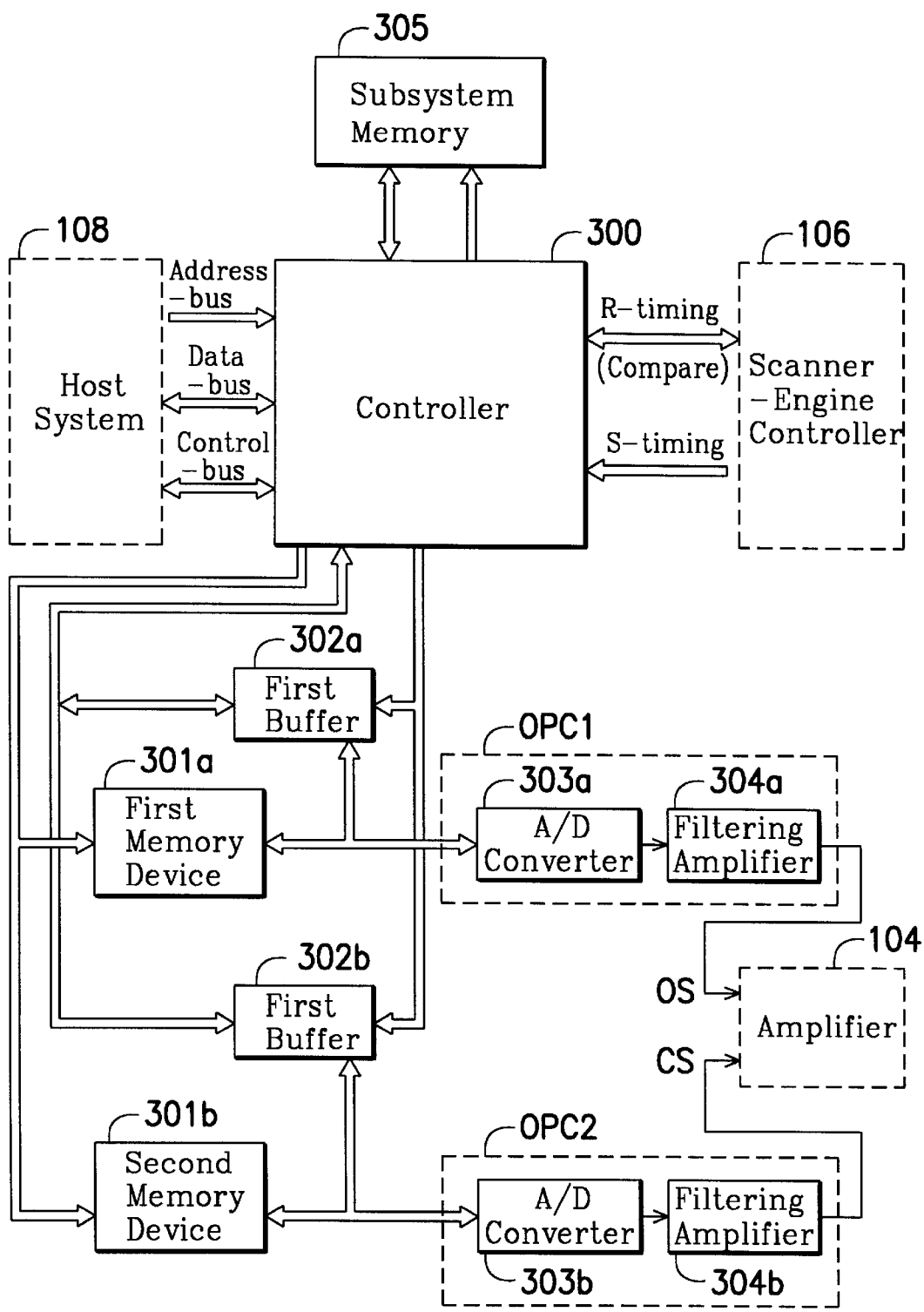
FIG. 3 illustrates a circuit block diagram of a first embodiment according to the present invention.

FIG. 3 illustrates a circuit block diagram of a first embodiment according to the present invention. The image-sensor emulating device 200 according to the first embodiment is described as follows. A controller 300 establishes a link with a host system 108 via the ISA bus of the host system. The ISA bus comprises address bus (Address_bus), data bus (Data_bus), and control bus (Control_bus). A first and a second memory device (301*a*, 301*b*) store reference image patterns downloaded from the host system 108 to the controller 300. A first and a second buffer (302*a*, 302*b*) control the transmitting directions of data flows stored in the first and second memory devices (301*a*, 301*b*).

A first output converter OPC1 comprises a first digital-to-analog (D/A) converter 303*a* and a filtering amplifier 304*a*. A second output converter OPC2 comprises a second digital-to-analog (D/A) converter 303*b* and a filtering amplifier 304*b*. These two output converters (OPC1, OPC2) convert the digital data read from the memory devices (301*a*, 301*b*) into analog data and output the analog data.

When the image-sensor emulating device 200 is applied to a debugging process, reference image patterns or standard image patterns are first loaded into the memory devices (301*a*, 301*b*). Next, the scanner-engine controller 106 outputs image sensing timing signal (S-timing) for utilization by the controller 300 to emulate the functions of an image-sensor. In addition, the controller 300 can be operated in response to the reference timing signal (R-timing) generated by itself. Then, the image patterns stored in the memory devices (301*a*, 301*b*) are respectively outputted to the output converters (OPC1, OPC2) by the controlling of the controller 300. In the first embodiment, the output signals (OS, CS) of the output converters (OPC1, OPC2) emulate the main output signal and the compensation signal of the image-sensor in a scanner respectively. The output signals (OS, CS) are amplified by the amplifier 104 and then are displayed in the host system 108. The debugging process can be carried out by comparing the displayed image patterns with the reference image patterns.

In addition, the image-sensor emulating device can if necessary provide a subsystem memory device 305 consisting of ROM or RAM memory for storing the controlling programs, messages, and data, etc., utilized by the controller 300.

From the above descriptions, the image-sensor emulating device is able to generate predetermined image signals (OS and CS), therefore replacing the functions of the image-sensor. By using the image-sensor emulating device to provide relevant signals generated by image-sensors, engineers can carry out the debugging process directed to the processing circuits subsequent to the image-sensors. Consequently, the efficiency and accuracy of circuit debugging is improved. Moreover, the reference timing signal (R_timing) generated by the image-sensor emulating device can also be compared with the image-sensing timing signal (S_timing) of the scanner for carrying out the debugging process. The reference timing signal (R_timing) can be programmed according to the actual application.

Second Embodiment

Figure 4:
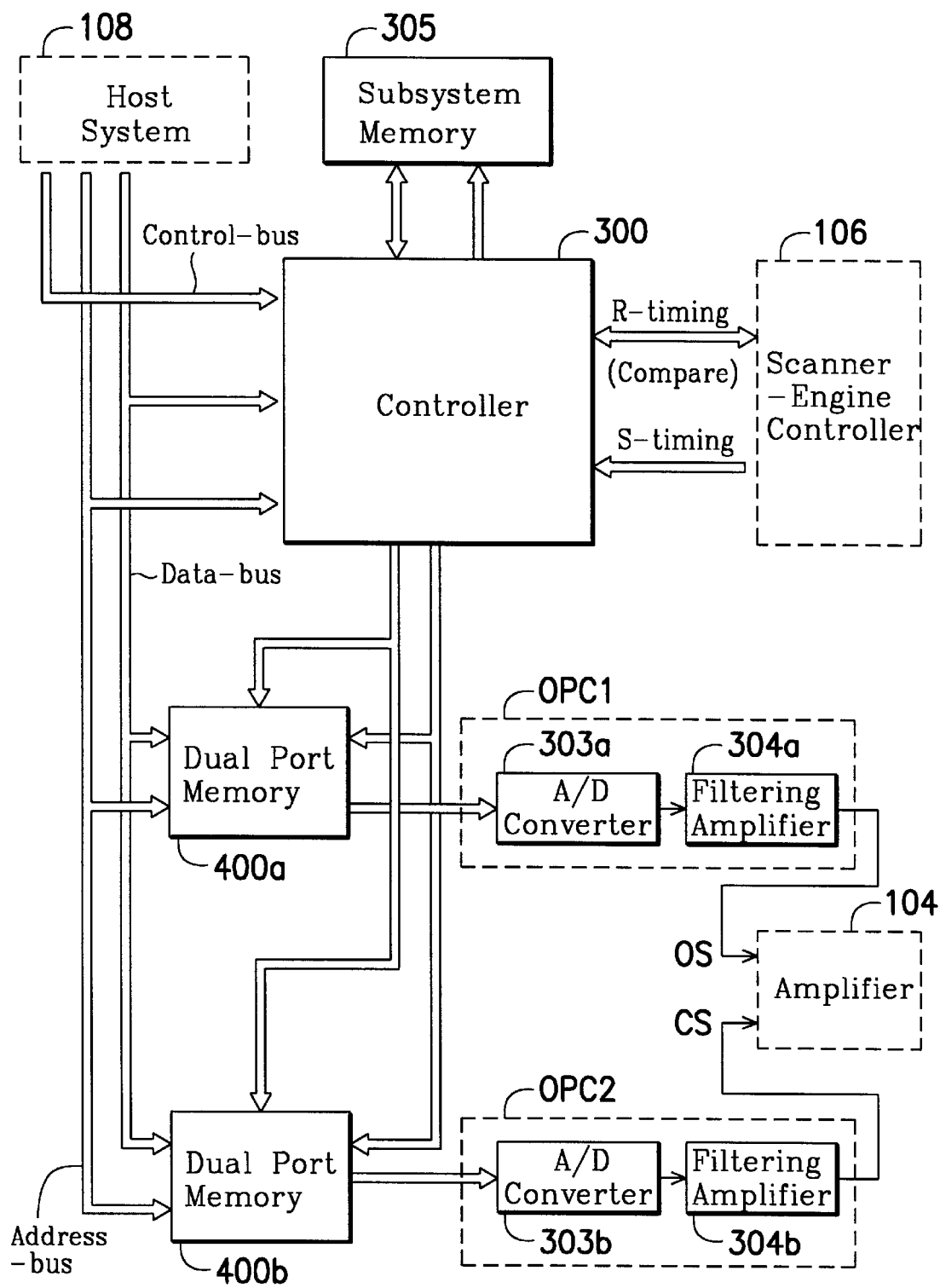
FIG. 4 illustrates a circuit block diagram of a second embodiment according to the present invention.

FIG. 4 illustrates a circuit block diagram of a second embodiment according to the present invention, wherein the same devices as described in the first embodiment are depicted with the same notations and numerals.

Comparing FIG. 3 with FIG. 4, the difference between the first embodiment and the second embodiment is that the second uses two dual port memory devices 400*a* and 400*b* for storing the image patterns downloaded from the host system 108. Because the host system 108 and the controller 300 can access (read and write) the two dual port memory devices 400*a* and 400*b* at different addresses simultaneously, the efficiency of downloading the image patterns from the host system 108 to the image-sensor emulating device 200 can be improved. The first and second buffer 302*a* and 302*b* also can be eliminated. The other functions of the second embodiment are the same as the first embodiment, and thus the descriptions are omitted here.

Third Embodiment

Figure 5:
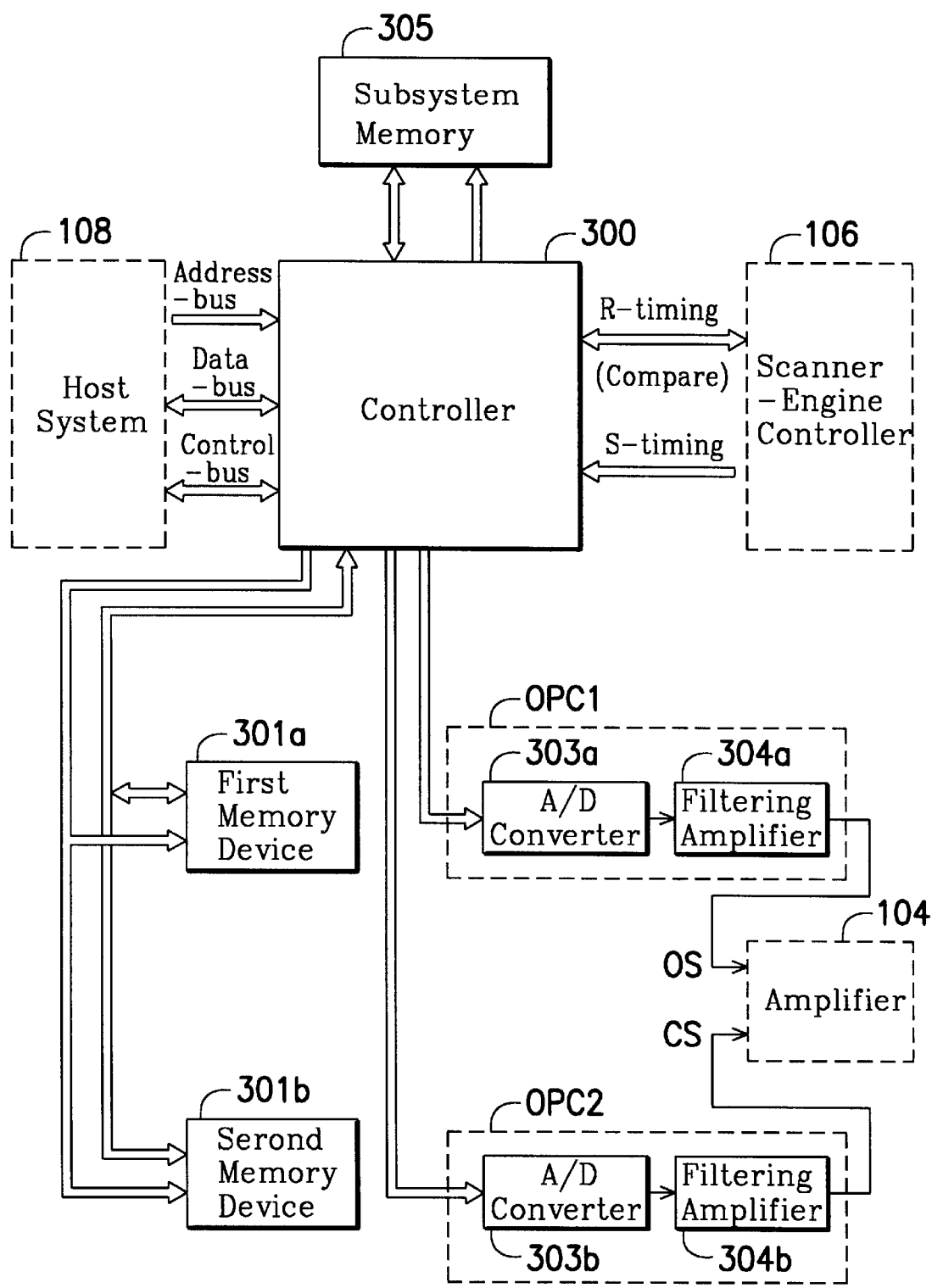
FIG. 5 illustrates a circuit block diagram of a third embodiment according to the present invention.

FIG. 5 illustrates a circuit block diagram of a third embodiment according to the present invention, wherein the same devices as described in the first embodiment are depicted with the same notations and numerals.

Comparing FIG. 3 with FIG. 5, the difference between the first embodiment and the third embodiment is that the third embodiment does not use the first and second buffers in the first embodiment. Therefore, in the second embodiment, the image patterns stored in the memory device 301*a* and 301*b* are read by the controller 300 first and stored temporarily in the controller 300, and then transmitted to the output converters (OPC1, OPC2). The other functions of the second embodiment are the same as the first embodiment, and thus the descriptions are omitted here.

In the above embodiments, the emulating device is applied to the image systems of scanners, but it is not limited to scanners. The emulating device can be applied to any image systems with image-sensors such as CCD and CIS, etc., for improving the efficiency of the debugging process. In addition, because the emulating device establishes links with various host systems via various standard peripheral interface buses, it can connect to different host system without any problem. Therefore, the emulating device according to this invention has portability and the ability of independent off-line functions. The sizes and numbers of the memory devices used to store image patterns are determined according to the sizes of the image patterns to be downloaded.

From above descriptions, both the image-sensor emulating device and the scanner are linked to the same host system. However, the image-sensor emulating device and the scanner also can be linked to two different host system respectively.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image-sensor emulating device for emulating the functions of image-sensors of an image processing system in a debugging process, comprising:

a controller establishing a link with a host system, via an internal bus of said host system, said controller generating a reference timing signal for sensing images, said image processing system displaying images in said host system;

at least one buffering memory device for storing reference image patterns downloaded from said host system to said controller; and at least one output converter receiving said reference image patterns read from said buffering memory device by said controller and converting said reference image patterns into output signals of said image-sensor emulating device, wherein said controller reads said reference image patterns in response to said reference timing signal for image sensing generated by said controller itself or a timing signal generated by said image processing system.

2. The image-sensor emulating device as claimed in claim 1, further comprising a subsystem memory device working in conjunction with said controller for storing image data.

3. The image-sensor emulating device as claimed in claim 1, wherein said buffering memory device is a dual port memory and can be accessed at different addresses simultaneously, thereby improving the efficiency of downloading said image patterns from said host system to said image-sensor emulating device.

4. The image-sensor emulating device as claimed in claim 1, wherein said output converter comprises at least a digital-to-analog converter and a filtering amplifier, thereby converting said reference image patterns read from said buffering memory device into analog signals.

* * * * *